(No Model.) 2 Sheets—Sheet 1.
G. J. S. COLLINS.
ROLLER BEARING.
No. 585,909. Patented July 6, 1897.
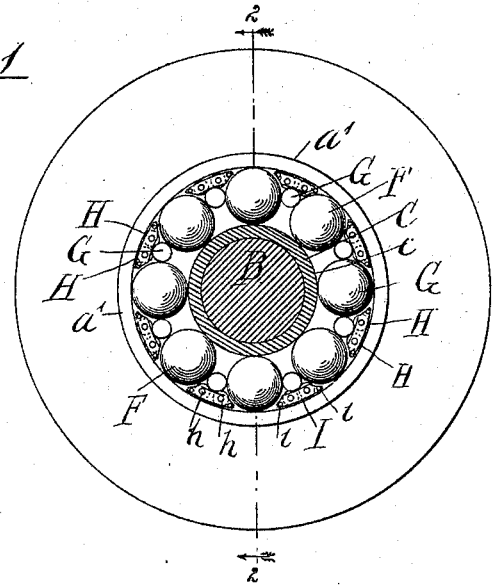
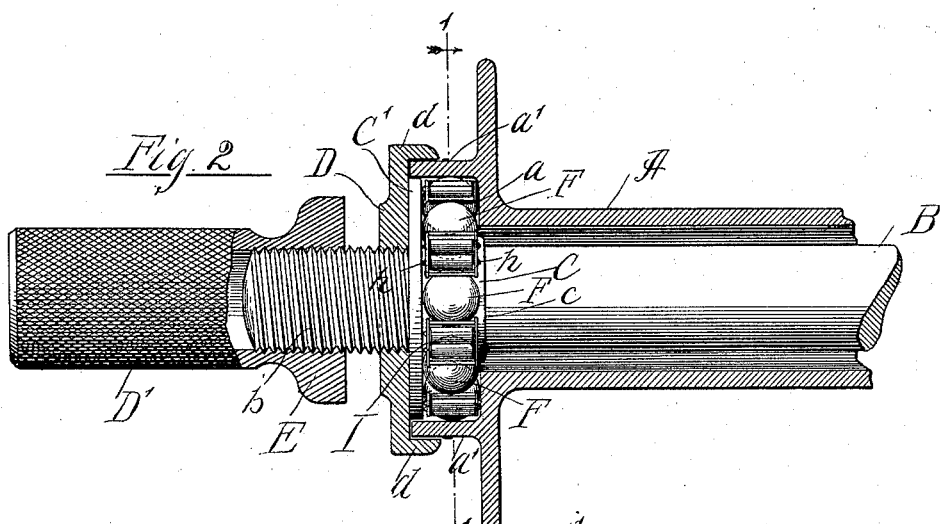
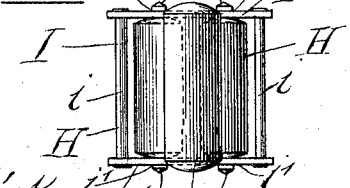
Witnesses
L. Clinton Hamlin
William L. Hall
Inventor
George J. S. Collins
by Dayton, Pooler Brown
his Attorneys (No Model.) 2 Sheets—Sheet 2.
G. J. S. COLLINS.
ROLLER BEARING.
No. 585,909. Patented July 6, 1897.
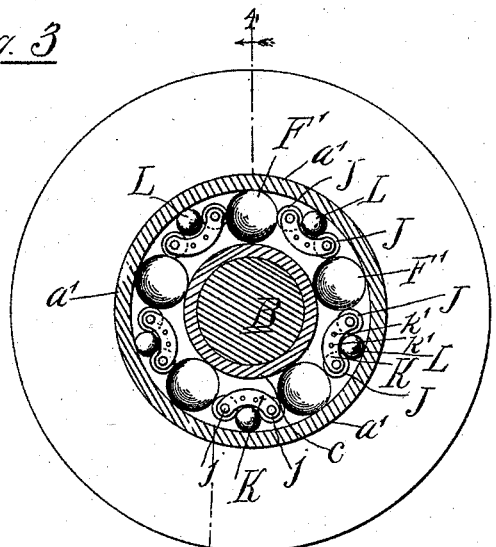
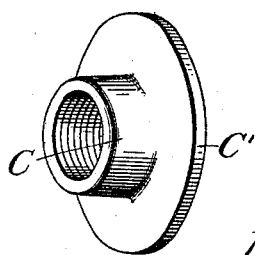
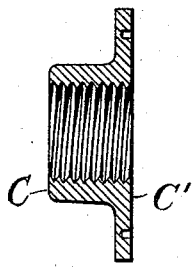
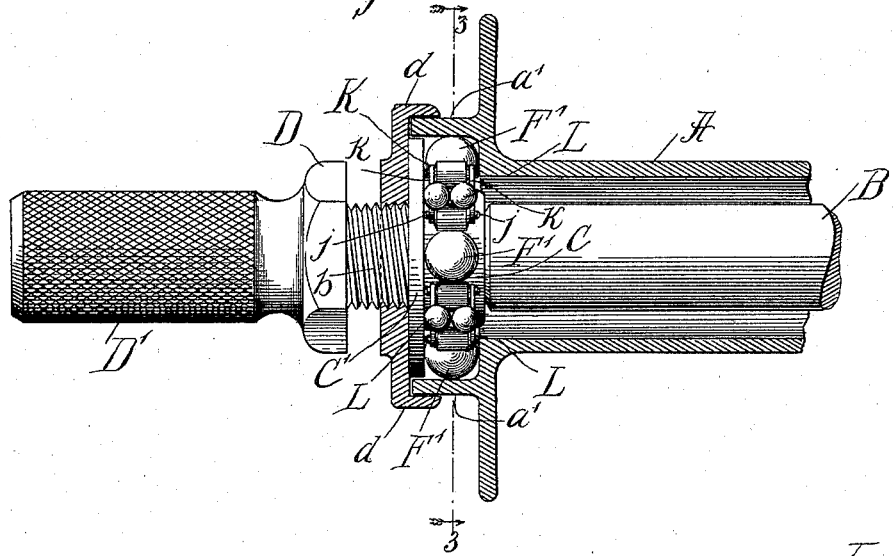
Witnesses.
L. Clinton Hamlink.
John W. Adams.
Inventor.
George J. S. Collins
by Dayton, Poole Brown
his Attorneys

UNITED STATES PATENT OFFICE.

GEORGE J. S. COLLINS, OF CHICAGO, ILLINOIS.

ROLLER-BEARING.

SPECIFICATION forming part of Letters Patent No. 585,909, dated July 6, 1897.

Application filed January 20, 1896. Renewed December 10, 1896. Serial No. 615,236. (No model.)

*To all whom it may concern:*

Be it known that I, GEORGE J. S. COLLINS, of Chicago, in the county of Cook and State of Illinois, have invented certain new and useful Improvements in Roller-Bearings; and I do hereby declare that the following is a full, clear, and exact description thereof, reference being had to the accompanying drawings, and to the letters of reference marked thereon, which form a part of this specification.

This invention relates to improvements in roller-bearings, and refers more specifically to improvements in the arrangement of the balls or roller elements within the box or casing.

The object of the invention is to provide a construction wherein the rollers or balls are so arranged with relation to each other and to the bearing parts of the journal as to prevent sliding friction between any of the contacting surfaces, or, in other words, from having movement in opposite directions with relation to each other.

The invention consists in the matters hereinafter set forth, and more particularly pointed out in the appended claims, and the same will be more readily understood by reference to the accompanying drawings, in which—

Figure 1 is a view, partly in axial section and partly in side elevation, of a fragmentary part of a bicycle-hub provided with bearings embodying my invention. Fig. 2 is a transverse sectional view taken on line 2 2 of Fig. 1, looking in the direction of the arrows. Figs. 3 and 4 are views similar to Figs. 1 and 2, respectively, illustrating a modification. Fig. 5 is an inside plan view of one of the ball-separating devices considerably enlarged. Fig. 6 is a perspective view of the flanged and internally-screw-threaded sleeve forming a part of the bearing. Fig. 7 is an axial section of the same.

The invention is herein shown as embodied in a bearing for a rear wheel of a safety-bicycle, but the invention is shown in this connection merely for convenience of illustration and description as one practical embodiment of the same, but it will be obvious that the invention may be applied without substantial change to any kind of bearing for which roller-bearings as a class are adapted.

Referring to the drawings, A designates as a whole a wheel-hub, which is of the usual tubular form and provided at its end with an annular enlargement $a$, the cylindric wall $a'$ of which forms the outer bearing part of a roller-race.

B designates the wheel-axle, screw-threaded at its end portion $b$, as usual. Upon this screw-threaded portion $b$ is fitted an internally-screw-threaded sleeve C, the outer surface $c$ of which forms the bearing-surface proper of the axle or the inner side of the roller-race. The outer end of the sleeve C is provided with an annular radial flange $C'$ of proper diameter to fit easily but closely within the outer end of the annular enlargement $a$ of the hub, thereby forming the outer end closure of the roller-race. The sleeve C is threaded tightly upon the axle B, so as to remain rigid with the latter when in ordinary use.

D designates an end cap threaded upon the end of the axle B, exteriorly to the sleeve C, and provided with a cylindric flange $d$, arranged to fit closely upon the exterior of the end of the wheel-hub, thereby serving to exclude dust and dirt from the bearings.

E designates a clamping-nut threaded upon the end of the axle, and between which end and the end cap D the rear-fork member of the bicycle-frame (not shown) is clamped. Said clamping-nut is herein shown as extended out in alinement with the axle to form a step $D'$ for the use of the rider in mounting the wheel.

It will be understood that the construction and arrangement of the foregoing-described parts are not in any way essential so far as the present invention is concerned, but may be varied as desired.

Referring now more particularly to the arrangement of the roller elements within the roller-race, F F designate a plurality of main supporting-roller elements, in this instance of spherical form and each equal in diameter to the radial depth of the roller-race. Between each pair of rollers F F is arranged a ball-separating device. These ball-separating devices each consist of one or more roller elements, which rest between and roll in contact with the proximate sides of the main rollers, but which are held from contact with either of the bearing-surfaces of the journal by means of one or more guide-rollers.

In the preferred arrangement illustrated in Figs. 1 and 2 a single roller element G (in this instance cylindric-shaped) is arranged to hold each pair of main supporting balls or elements separated from each other, while two guide-rollers H H (also cylindric) serve to hold the ball-separating rollers from contact with the bearing parts of the journal and in proper position between the balls. The three roller elements constituting each ball-separating device are arranged and held in triangular relation to each other as follows: I designates as a whole a caging device consisting of side members or plates I' I', held at a distance apart slightly less than the width of the journal-box and in parallel relation to each other by means of distance studs or rivets $i\ i$, extending through their end portions. Each of the guide-rollers H is reduced at its end to form trunnions $h\ h$, which are arranged to extend through journal-apertures $i'\ i'$, formed through the said members or plates I', the width of said side plates being slightly less than the diameter of the guide-rollers, so that the peripheries of the latter will extend radially outside of and inside of the margins of said plates. The apertures $i'\ i'$ are so located with relation to each other that the cylindric guide-rollers H will be held exactly parallel with their peripheries adjacent to but not in contact with each other. The two guide-rollers thus connected are arranged within the journal-box between adjacent pairs of main supporting-rollers F F and in contact with the inner surface of the outer bearing part $a'$ of the journal. The ball-separating roller G is of the largest diameter that may be arranged within the space formed by the depression between the two guide-rollers at their inner sides and the adjacent main supporting-balls F F, as indicated clearly in Fig. 1. When arranged in this manner, it will be seen that the guide-rollers H H will be held by the ball-separating roller G outwardly against the inner surface of the outer bearing part $a'$ of the journal-box at a point centrally between the balls F F and free from contact with either of them, and by reason of the fact that the ball-separating roller G is of larger diameter than the distance between adjacent main supporting balls or rollers it will obviously be impossible for said supporting-roller to move radially inward so as to permit any of the elements becoming displaced. In order to hold the caging device from lateral movement, so as to contact with the sides of the roller-race, the trunnions $h$ of the guide-rollers H are extended some distance beyond the outer surface of the side members I' and are rounded or made conical at their ends, so as to contact with the side walls of the roller-race only at the points of their axes of rotation.

When constructed and arranged as hereinbefore described, it will be seen that none of the contacting bearing parts of the journal will have movement in opposing directions with relation to each other, but that all of the roller elements, including both the main supporting-roller elements and those of the ball-separating devices, wherever they have contact with each other and with the bearing-surfaces of the box and journal, will move in the same direction relatively to each other and at the same surface speed, thus insuring a perfect rolling contact.

In Figs. 3 and 4 an arrangement is illustrated wherein two roller elements are shown as acting to hold the main elements separated, consisting of cylindric rollers J J, provided at each end with trunions, as $j\ j$, which are engaged at their ends with parallel side members $k\ k$ of a caging device K, which serve to hold said rollers J J parallel with and in fixed relation to each other. Between the rollers J J and the outer wall of the race and resting in contact with both the rollers J J and said part of the bearing $a'$ is arranged one or more roller elements, in this instance two balls L L. The diameters of the roller elements J J L and the distance at which the rollers J J are held from each other are such, with relation to the diameter of the main roller elements, that said ball-separating devices as a whole will be held in the position shown and from moving radially inward. In other words, their arrangement is such that a right line drawn from the center of either roller J J to the center of the main roller F', against which it rests, will enter the main roller at a point radially outside of a line drawn concentrically with the journal and centrally through the main rollers. This arrangement insures that the roller elements will all be positively retained in proper relation to each other and the ball-separating rollers J J from contact with the bearing parts of the journal. The parallel side members $k\ k$ of the caging device K are held together in fixed relation to each other by means of distance-studs $k'\ k'$, riveted or otherwise secured thereto, and in order to hold the caging device from contact with the sides of the roller-race the trunnions $j\ j$ of the rollers J J are extended through and beyond the parallel side members $k\ k$ and are rounded or made conical at their ends, so as to contact only at the points of their axes of rotation. It will be seen that in this arrangement also both the main supporting elements and those of the ball-separating devices, wherever they contact with each other and with the bearing-surfaces of the box and journal, roll in the same direction and move at the same surface speed. In other words, there is a perfect rolling contact between all parts of the bearing. Obviously a construction wherein all parts have perfect rolling contact with each other reduces the friction to a minimum and produces a roller-bearing more nearly perfect than has heretofore been known.

While the constructions herein described are deemed practical and preferred embodiments of my invention, yet it will be obvious that the various details of construction may be changed without departing from the spirit of the invention and without involving more than ordinary mechanical skill. For instance, the details of construction of the caging device are not essential, so long as it be such as to confine the roller elements of the ball-separating devices in proper relation to each other.

I claim as my invention—

1. A roller-bearing comprising a journal-box, an annular roller-race therein, main supporting-roller elements within the race, and roller-separating devices each embracing one or more smaller roller elements interposed between adjacent pairs of main supporting-roller elements, and supported free from contact with the journal and opposing wall of the housing.

2. A roller-bearing consisting of a journal-box an annular roller-race therein, main supporting elements within the race, and roller-separating devices each embracing one or more smaller roller elements, interposed between adjacent pairs of main support roller elements, and one or more guide-rollers arranged to support said ball-separating elements free from contact with the journal and housing.

3. A roller-bearing comprising a journal-box, an annular roller-race therein, main supporting-roller elements within the race, and roller-separating devices each embracing three smaller roller elements arranged and confined in triangular relation to each other within the space between pairs of adjacent main supporting-rollers and one of the bearing-surfaces of the bearing.

4. A roller-bearing comprising a journal-box, an annular roller-race therein, main supporting-roller elements within the race, and roller-separating devices each embracing three smaller roller elements arranged in triangular relation to each other, two of which are of axially-elongated form and held in fixed relation by means of a caging device, and the third of which is arranged to rest in rolling contact with the other two.

5. A roller-bearing comprising a journal-box, an annular roller-race therein, main supporting-roller elements within the race, and roller-separating devices arranged between each pair of adjacent main supporting-rollers, said devices each comprising three smaller roller elements arranged in triangular relation to each other, two of which are provided at each end with axially-arranged trunnions, held in parallel relation with each other by means of a caging device consisting of parallel side plates secured at a fixed distance apart by means of distance-studs, and provided with bearing-apertures with which the trunnions of said roller elements are engaged.

6. A roller-bearing comprising a journal-box, an annular roller-race therein, main supporting-roller elements within the race, and roller-separating devices arranged between each pair of adjacent main supporting-rollers, said devices each comprising three smaller roller elements arranged in triangular relation to each other, two of which are provided at each end with axially-arranged trunnions, held in parallel relation with each other by means of a caging device consisting of parallel side plates secured at a fixed distance apart by means of distance-studs, and provided with bearing-apertures with which the trunnions of said roller elements are engaged, said trunnions being extended through and beyond the side plates of the caging devices to form bearing parts which engage the sides of the ball-race and hold the caging devices from contact therewith.

7. A roller-bearing comprising a journal-box, an annular roller-race therein, a plurality of roller elements within the race, each of a diameter equal to the radial depth of said race, whereby the bearing-pressure is transmitted directly from the journal-box to the journal, and roller-separating devices, each embracing one or more smaller roller elements interposed between adjacent pairs of main supporting-roller elements and supported free from contact with the journal and the housing by means of guide-rollers.

In testimony that I claim the foregoing as my invention I affix my signature, in presence of two witnesses, this 16th day of January, A. D. 1896.

GEORGE J. S. COLLINS.

Witnesses:
ALBERT H. GRAVES,
WILLIAM L. HALL.